(12) United States Patent
Kim et al.

(10) Patent No.: US 7,278,888 B2
(45) Date of Patent: Oct. 9, 2007

(54) BIAS-T APPARATUS AND CENTER CONDUCTOR OF THE SAME

(75) Inventors: Duk-Yong Kim, Hwasong-shi (KR); Young-Choon Jang, Chunchon-shi (KR); Jin-Bae Kim, Suwon-shi (KR)

(73) Assignee: KMW Inc., Hwasong-Shi, Kyonggi-Do (KR)

( * ) Notice: Subject to any disclaimer, the term of this patent is extended or adjusted under 35 U.S.C. 154(b) by 0 days.

(21) Appl. No.: 10/632,795

(22) Filed: Aug. 4, 2003

(65) Prior Publication Data

US 2005/0101191 A1   May 12, 2005

(30) Foreign Application Priority Data

Aug. 3, 2002   (KR) ...................... 10-2002-0045997

(51) Int. Cl.
*H01R 13/66* (2006.01)
(52) U.S. Cl. .................................. 439/620.21; 361/117
(58) Field of Classification Search .......... 439/620.21, 439/578, 638; 361/117, 119, 120, 124, 126–129; 333/26, 245, 167
See application file for complete search history.

(56) References Cited

U.S. PATENT DOCUMENTS

| | | | | |
|---|---|---|---|---|
| 4,329,665 A | * | 5/1982 | Kawai et al. | 333/182 |
| 5,032,809 A | * | 7/1991 | Chambers et al. | 333/183 |
| 5,206,779 A | * | 4/1993 | Sato et al. | 361/111 |
| 5,856,767 A | * | 1/1999 | D'Oro et al. | 333/245 |
| 6,061,223 A | * | 5/2000 | Jones et al. | 361/119 |
| 6,719,813 B2 | * | 4/2004 | Kojima et al. | 29/25.03 |
| 6,721,155 B2 | * | 4/2004 | Ryman | 361/117 |
| 6,754,060 B2 | * | 6/2004 | Kauffman | 361/119 |

(Continued)

FOREIGN PATENT DOCUMENTS

EP   0 746 051   12/1996

OTHER PUBLICATIONS

*Communication* from the European Patent Office issued in Applicant's corresponding Korean Patent Application No. 2002-45997 dated Jul. 1, 2005.

*Primary Examiner*—Alexander Gilman
(74) *Attorney, Agent, or Firm*—Robert E. Bushnell, Esq.

(57) ABSTRACT

A bias-T apparatus and its center conductor for providing radio frequency signals and power source to outdoor equipment of a Base Transceiver Station (BTS) in a mobile communication. system. The bias-T apparatus includes a housing having an input connector and an output connector integrally formed at both ends of the housing, a housing hole formed through central portions of the input and output connectors, and a fixing hole formed inside of an upper central portion of the housing, the input connector being connected to a transceiver system, the output connector being connected to an antenna; and a center conductor assembly connected to the input and output connectors for providing electric connection for the bias-T apparatus. The center conductor assembly includes a first center conductor having a reception hole extending longitudinally from one end of the first center conductor; and a second center conductor having a shaft which extends from one end of the second center conductor and is inserted in the reception hole, the shaft having an anodized outer surface which enables the distance between the first center conductor and the second center conductor to be reduced up to several microns, thereby increasing capacitance of a formed capacitor.

13 Claims, 5 Drawing Sheets

U.S. PATENT DOCUMENTS 6,771,488 B2 *  8/2004  Takagi et al. ................ 361/523
6,791,436 B2 *  9/2004  Zennamo et al. ........... 333/185
6,791,821 B1 *  9/2004  Monnett ..................... 361/509

* cited by examiner

BIAS-T APPARATUS AND CENTER CONDUCTOR OF THE SAME

CLAIM OF PRIORITY

This application claims priority to an application entitled "Bias T apparatus and center conductor of the same" filed in the Korean Industrial Property Office on Aug. 3, 2002 and assigned Serial. No. 2002-45997, the contents of which are hereby incorporated by reference.

BACKGROUND OF THE INVENTION

1. Field of the Invention

The present invention relates to a mobile communication system, and more particularly to a bias-T apparatus and its center conductor for providing radio frequency signals and power source to outdoor equipment of a Base Transceiver Station (BTS) in a mobile communication system.

2. Description of the Related Art

In general, ground equipment in a tower-top BTS either employs a pre-amplifier or enables an upward/downward frequency converter to have an additional amplifying function, in order to compensate for loss of signal or power in an inter facility link cable (IFL) connected to a remote radio frequency (RF) unit located in outdoor equipment (an antenna tower) of the BTS. In addition, the ground equipment also employs a bias-T apparatus or line amplifier, in order to supply electric power to the remote RF unit located in the antenna tower.

FIG. 1 is a block diagram of one example of conventional tower-top BTSs. Referring to FIG. 1, a conventional BTS includes a ground BTS 100 constructed on the ground and an antenna tower 114 constructed outdoor in order to improve the transmission/reception level of radio frequency (RF) signals.

Hereinafter, the construction of the ground BTS 100 will be referred first. A control/interfacing unit 102 performs signal matching with a base station controller (BSC) for controlling the BTS and generally controls the operation of the BTS. A digital processor 104 CDMA-modulates and -demodulates forward and backward signals according to the control of the control/interfacing unit 102. An upward/downward frequency converter 106 upward-converts the forward signal into a signal of a CDMA wireless band and downward-converts the backward signal into an intermediate frequency signal used in the digital processor 104. A pre-amplifier 108 compensates for line loss of the signal outputted from the upward/downward frequency converter 106 and amplifies the signal to meet input requirements for RF processing of the signal by the antenna tower 114. A bias-T circuit 110 synthesizes power and the output signal of the pre-amplifier 108 and transmits the synthesized signal through an IFL cable to the antenna tower 114, and a bias-T circuit 112 receives a signal from the antenna tower 114 and transmits the signal to the upward/downward frequency converter 106.

Next, the antenna tower 114 will be described, which includes a main amplifier 116, a low noise amplifier 124, and antennas 118 and 120. The main amplifier 116 amplifies power of the signal from the bias-T circuit 110 up to a level which meets a standard required for a forward radio link to a mobile subscriber terminal. The low noise amplifier 124 amplifies with minimum noise the signal received from the antenna 120 and then transmits the amplified signal to the bias-T circuit 112.

FIG. 2 is a circuit diagram of the bias-T circuit shown in FIG. 1. In the bias-T circuit as shown in FIG. 2, when the signal outputted from the pre-amplifier 108 is inputted through a signal input node 201, the signal is outputted to a signal output node 202 through a capacitor C1 204 but is not outputted to another node 203 through which direct current is applied. It is because the inputted signal is a radio frequency signal which causes the node 203 to have an infinite impedance due to an inductor L1 205. Further, direct current (DC) power is inputted through the power input node 201 and the inductor 205. Therefore, the output signal of the pre-amplifier 108 and the DC power are synthesized through the bias-T circuit 110 and are then transmitted to the antenna tower 114.

Further, the bias-T circuit 112 processes the backward signal in the same way, thereby transmitting the backward signal to the upward/downward frequency converter 106.

There are several ways of constructing the capacitor C1 204. First, a chip capacitor may be employed. However, in this case, a portion between an input node and a transmission line causes the assembling of the capacitor to be more complicated and difficult.

Second, two electrode plates (that is, a center conductor) constituting the capacitor C1 are installed at a portion between the input node and the transmission line while being spaced a predetermined gap from each other. In general, a capacitor has a capacitance which is proportional to the area size of the electrode plates and inversely proportional to the distance between the electrode plates. However, recent electronic appliances and their elements tend to be lighter, thinner, shorter, and smaller, thereby causing it difficult to enlarge the area of the electrode plates in order to increase the capacitance since the area of the electrode plates has a large influence on the size of the capacitor. Therefore, a method of reducing the gap between the electrode plates is usually employed. However, there is a limitation in reducing the gap between the electrode plates, and thus there is a limitation in increasing the capacitance of the capacitor.

SUMMARY OF THE INVENTION

Accordingly, the present invention has been made to solve the above-mentioned problems occurring in the conventional art, and an object of the present invention is to provide a bias-T apparatus and its center conductor, in which electrode plates of a capacitor are opposed to each other with an increased area and with a gap of several microns between them, thereby increasing the capacitance of the capacitor and improving the performance of the apparatus.

In order to accomplish this object, the present invention provides a bias-T comprising: a housing including an input connector and an output connector integrally formed at opposite sides of the housing, the input connector being connected to a transceiver system, the output connector being connected to an antenna, the housing having a housing hole and a fixing hole, the housing hole being formed longitudinally through central portions of the input and output connectors, the fixing hole being formed through a central upper portion of the housing; and a center conductor connected to the input and output connectors, thereby enabling electric connection between them.

In accordance with another aspect of the present invention, there is provided a center conductor of a bias-T having a housing which has a housing hole and includes an input connector and an output connector formed at opposite sides of the housing hole. The input connector is connected to a transceiver system, and the output connector is connected to an antenna. The center conductor includes a first conductor inserted in a first housing hole portion formed through a central portion of the output connector and a second conductor inserted in a second housing hole portion formed through a central portion of the input connector. The first conductor has a reception tube, and the second conductor has a conductor shaft. The conductor shaft is inserted in the reception tube so that the first conductor and the second conductor are assembled with each other in the housing hole. At least one of an inner surface of the reception tube and an outer surface of the conductor shaft is anodized.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. In the following description of the present invention, a detailed description of known functions and configurations incorporated herein will be omitted when it may make the subject matter of the present invention rather unclear.

The detailed description of the preferred embodiments of the present invention with reference to the accompanying drawings is described hereinafter.

Figure 1:
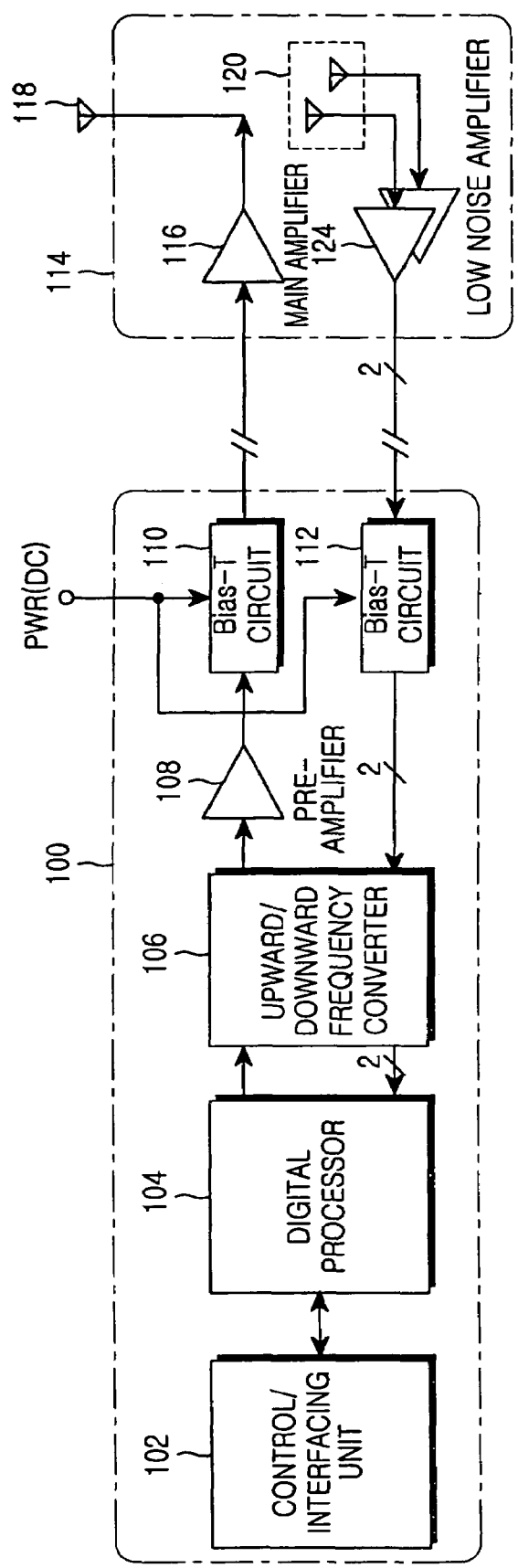
FIG. 1 is a block diagram of an example of conventional tower-top base transceiver systems.
Figure 2:
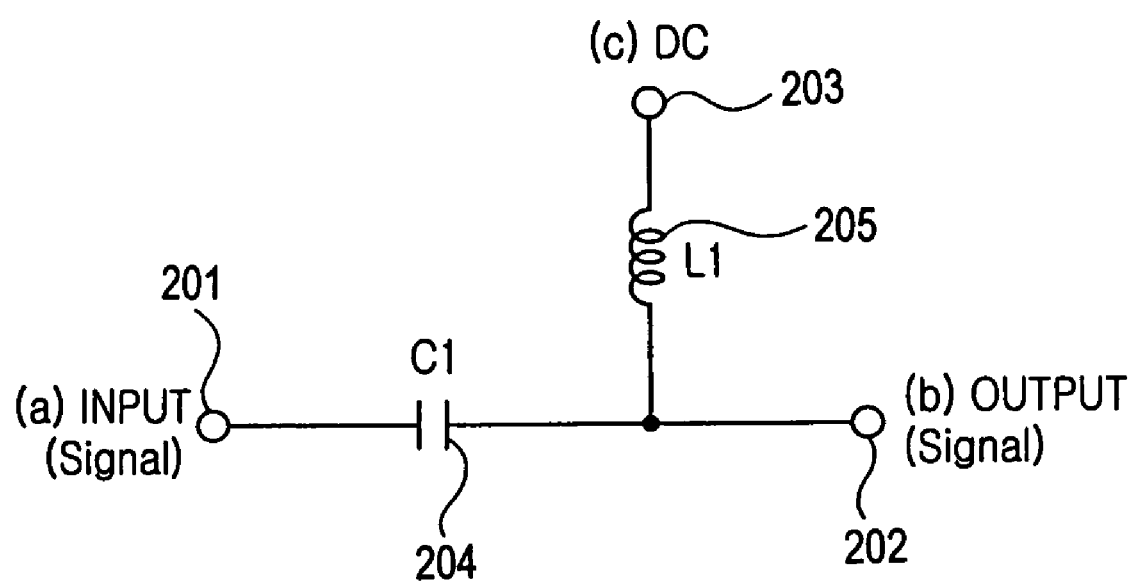
FIG. 2 is a circuit diagram of the bias-T circuit shown in FIG. 1.
Figure 3:
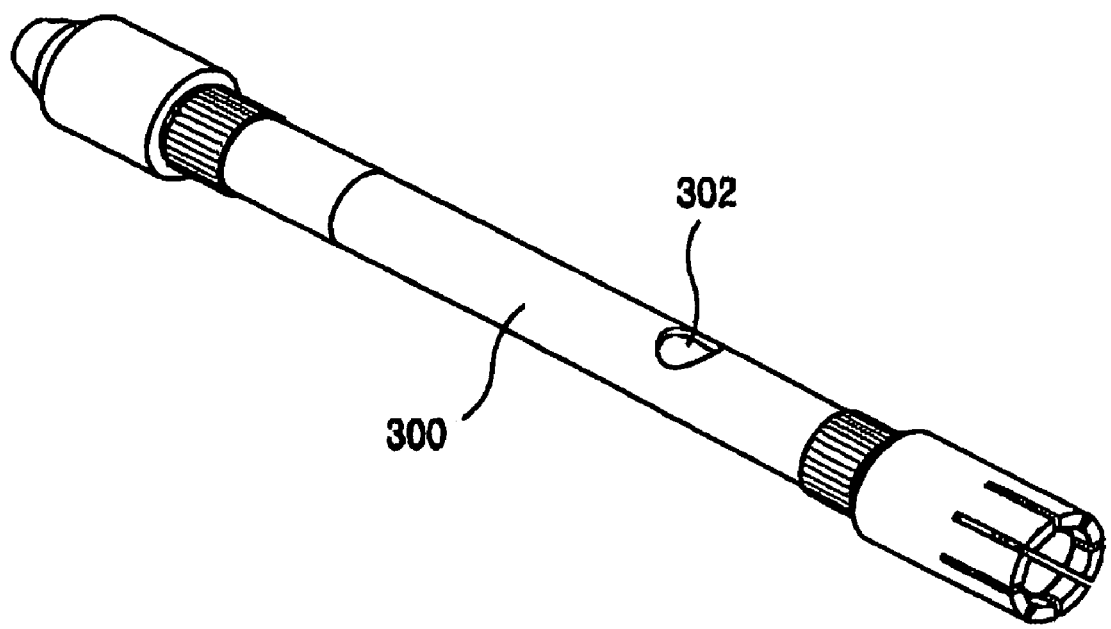
FIG. 3 is a perspective view of a center conductor according to an embodiment of the present invention.
Figure 4:
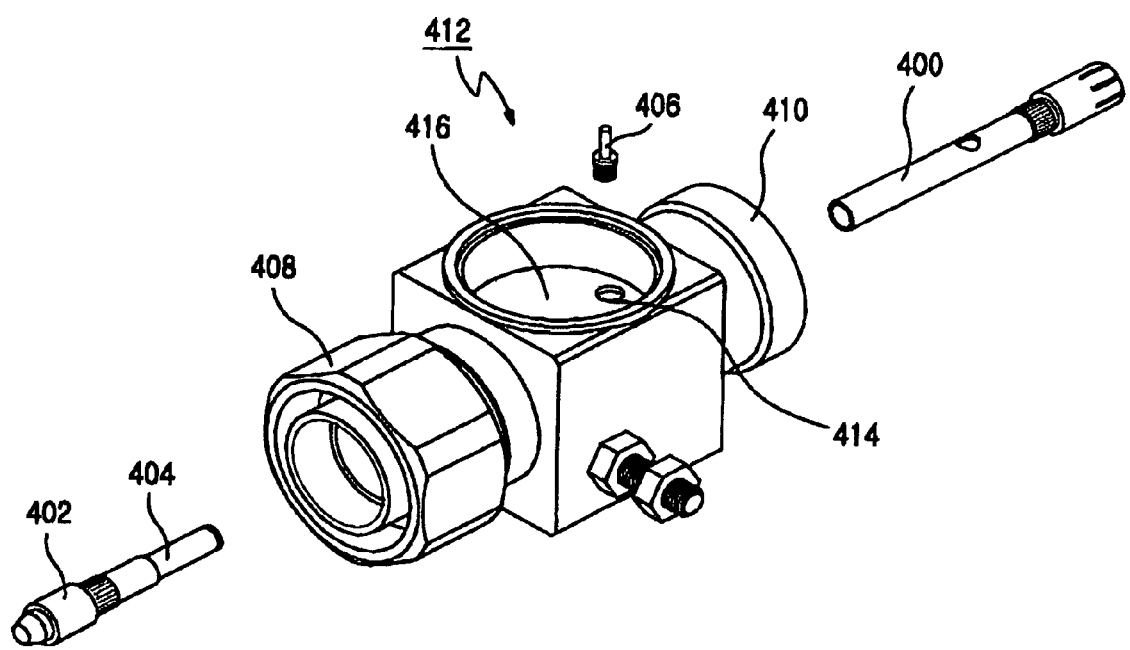
FIG. 4 is an exploded perspective view of a bias-T apparatus according to an embodiment of the present invention.
Figure 5:
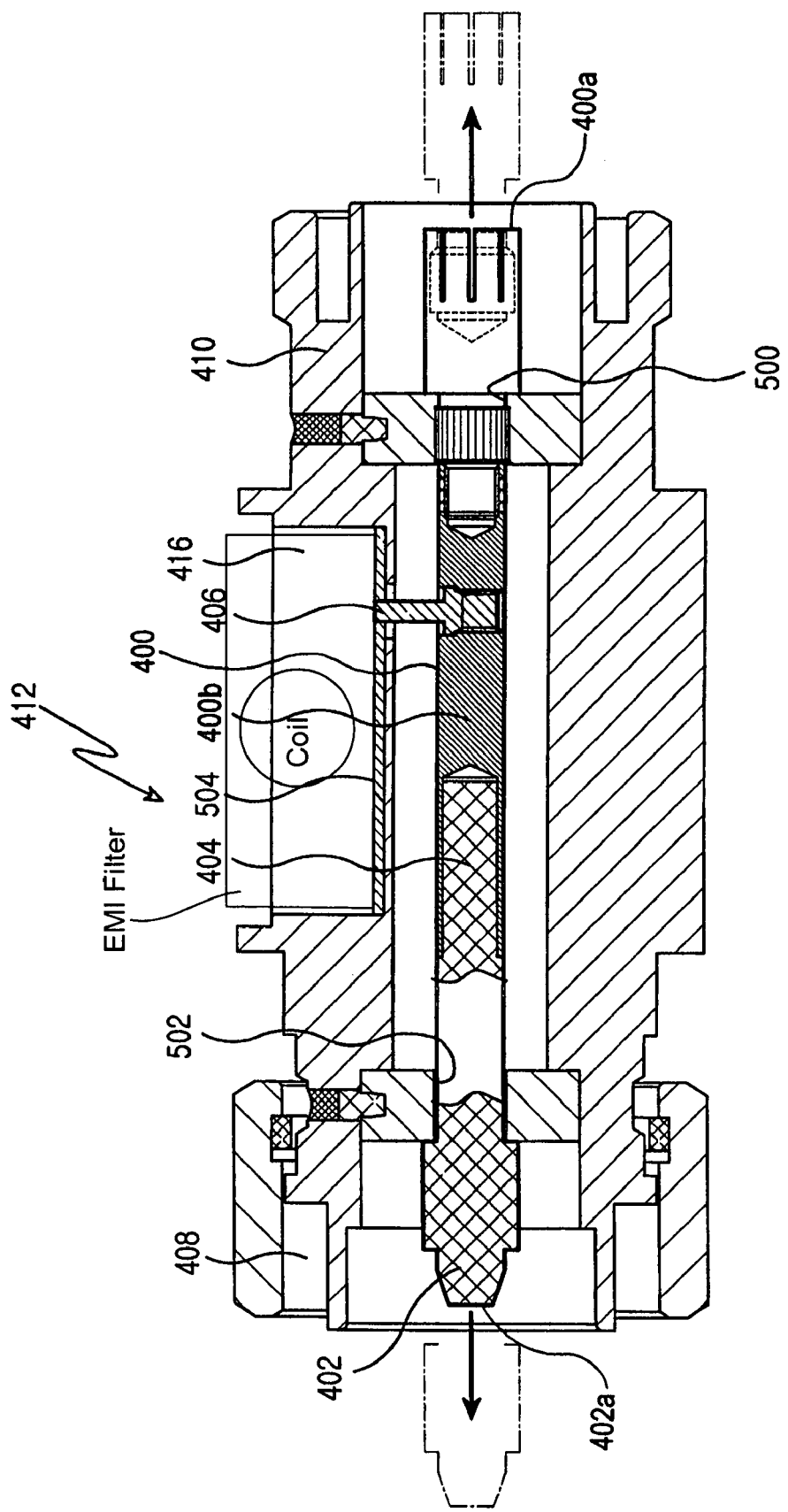
FIG. 5 is an assembled side-sectional view of the bias-T apparatus shown in FIG. 4.

FIG. 3 is a perspective view of a center conductor according to an embodiment of the present invention, FIG. 4 is an exploded perspective view of a bias-T apparatus according to an embodiment of the present invention, and FIG. 5 is an assembled side-sectional view of the bias-T apparatus shown in FIG. 4. FIGS. 4 and 5 show a state in which the center conductor 300 shown in FIG. 3 is inserted into the bias-T apparatus.

Referring to FIG. 3, a center conductor 300 includes a first conductor 400 and a second conductor 402 assembled with each other. The center conductor 300 can function as a capacitor and provide electric connection between the ground BTS and the antennas when the first conductor 400 and the second conductor 402 have been assembled with each other. A center hole 302 formed in the center conductor 300 has a screwed portion which enables a fixing pin 406 to be screw-assembled in the center hole 302. The fixing pin 406 enables DC power to be supplied through the fixing pin 406.

Referring to FIGS. 4 and 5, the bias-T apparatus has a housing 412. The housing 412 has a housing hole and a fixing hole 414. The housing hole is formed longitudinally through the housing 412, and the fixing hole 414 is formed through an upper portion of the housing 412 and is connected to the housing hole. The housing 412 includes an input connector 408 and an output connector 410 which are integrally formed at opposite sides of the housing 412. The input connector 408 is connected to the ground BTS, and the output connector 410 is connected to the antenna side. The center conductor 300 including the first conductor 400 and the second conductor 402 is inserted in the housing hole formed in the housing 412.

The first conductor 400 of the center conductor 300 is disposed in the housing hole. The first conductor 400 includes a first connector pin 400a and a reception tube 400b which form opposite ends of the first conductor 400. The first connector pin 400a is connected through the output connector 410 to the antenna side. The reception tube 400b is hollow and thus has a reception hole which is formed in the reception tube 400b and extends in the longitudinal direction of the housing hole. Preferably, the reception tube 400b has a cylindrical shape. The housing hole has a first housing hole portion 500 formed through a central portion of the output connector 410 and a second housing hole portion 502 formed through a central portion of the input connector 408. The first conductor 400 having the construction described above is inserted into the first housing hole portion 500. The second conductor 402 of the center conductor 300 is also disposed in the housing hole of the housing 412. The second conductor 402 has a second connector pin 402a and a conductor shaft 404 which form opposite ends of the second conductor 402. The second connector pin 402a is connected to the ground BTS through the input connector 408. The conductor shaft 404 is inserted in the reception hole formed in the reception tube 400b of the first conductor 400. The conductor shaft 404 has an anodized outer surface. The second conductor 402 is inserted in the second housing hole portion 502 of the housing hole formed inside of the input connector 408. The conductor shaft 404 has a shape corresponding to that of the reception tube 400b, preferably a cylindrical shape.

In assembling the center conductor 300 as described above, the first conductor 400 is inserted in the first housing hole portion 500 inside of the output connector 410 and the second conductor 402 is inserted in the second housing hole portion 502 inside of the input connector 408, and then the conductor shaft 404 of the second conductor 402 is inserted in the reception tube 400b of the first conductor 400, so that the first conductor 400 and the second conductor 402 are assembled with each. other in the housing 412.

In the center conductor 300 constructed by the first conductor 400 and the second conductor 402 as described above, the conductor shaft 404 and the reception tube 400b will function as electrode plates of the capacitor. Therefore, contact surfaces between the conductor shaft 404 and the reception tube 400b corresponding to electrode plates of the capacitor can be enlarged without increasing the entire size of the center conductor 300 by simply increasing a degree by which the conductor shaft 404 is inserted in the reception tube 400b. Further, the outer surface of the conductor shaft 404 (or the inner surface of the reception tube 400b) is anodized, that is, an oxide film is formed on the outer surface of the conductor shaft 404 or the inner surface of the reception tube 400b. Therefore, the conductor shaft 404 and the reception tube 400b can be in close contact with each other while enabling them to function as the electrode plates of the capacitor, so that the gap between the conductor shaft 404 and the reception tube 400b functioning as the electrode plates can be reduced up to several microns.

Meanwhile, the fixing pin 406 is vertically inserted into the center hole 302 of the first conductor 400 so as to fix the first conductor 400 to the housing 412 and apply DC power to the output side of the transmission signal of the center conductor 300.

In the housing 412 of the bias-T apparatus, the input connector 408 connected to the ground BTS and the output connector 410 connected to the antenna side are formed integrally with opposite sides of the housing 412. The housing hole formed in the housing 412 includes the first housing hole portion 500 in which the first conductor 400 can be inserted and the second housing hole portion 502 in which the second conductor 402 can be inserted. Also, the housing 412 has the fixing hole 414 in which the fixing pin 406 can be vertically fitted. Moreover, a recess 416 for receiving various elements is formed at an upper portion of the housing 412, which is located above and connected to the fixing hole 414. The recess 416 may receive either an EMI filter including coils and dielectric materials or a gas tube arrester and diodes for protecting the ground BTS from the surge voltage introduced from the output connector 410.

Hereinafter, the operation of the bias-T apparatus in which the center conductor 300 has been inserted in the housing 412 will be described.

For example, when an RF signal is inputted to the second conductor 402, the RF signal passes through a capacitor formed by an assembly of the second conductor 402 and the first conductor 400 and is then outputted to an antenna. Meanwhile, DC power is supplied to the first conductor 400 through the EMI filter and the fixing pin 406. That is, the RF signal and the DC power are transmitted through the bias-T apparatus to the antenna tower. In this case, the RF signal is not outputted toward the fixing pin 406 to which the DC power is applied, because an inductor, a coil constructing the EMI filter, causes the impedance of the fixing pin 406 to be infinite. Further, the DC power is not outputted to the second conductor 402, because the first conductor 400 and the second conductor 402 assembled with each other construct a capacitor. That is, the second conductor 402 has an infinite impedance with respect to the DC power.

Although the above description is given about the operation of the bias-T apparatus when a forward signal is inputted, the bias-T apparatus operates in the same manner for the backward signal also.

FIG. 5 is a sectional view of a bias-T apparatus according to an embodiment of the present invention. FIG. 5 shows a state in which the center conductor 300 and the fixing pin 406 have been inserted in the housing 412 shown in FIG. 4. Referring to FIG. 5, the first conductor 400 is inserted in the first housing hole portion 500 and the second conductor 402 is inserted in the second housing hole portion 502. A substrate 504 applies DC power to the fixing pin 406. Elements in addition to those described above can be seen from FIG. 4.

While the invention has been shown and described with reference to certain preferred embodiments thereof, it will be understood by those skilled in the art that various changes in form and details may be made therein without departing from the spirit and scope of the invention as defined by the appended claims. For example, instead of anodizing the outer surface of the conductor shaft 404, the inner surface of the reception tube 400b may be anodized. Further, instead of the construction of the center conductor 300 described above in which the first conductor 400 has the reception tube 400b and the second conductor 402 has the conductor shaft 404, the first conductor 400 may have a conductor shaft and the second conductor 402 may have a reception tube.

Therefore, the present invention has a scope which is not restricted by the preferred embodiments described above but can be defined by the appended claims and their equivalents.

As described above, the present invention enables the first conductor and the second conductor to be disposed in close contact with each other, even with a gap of several microns between them, by means of the anodized outer surface of the conductor shaft, without inserting a separate element or soldering. That is, the present invention can increase the capacitance of the capacitor nearly without limitation by constructing the capacitor with the first and second conductors assembled together. Further, the present invention saves the manufacturing cost since it employs a bias-T apparatus having an integrated housing.

What is claimed is:

1. A bias-T apparatus comprising:
a housing comprising an input connector to be connected to a ground base transceiver station and an output connector to be connected to an antenna, said input connector and said output connector integrally formed at opposite sides of the housing, the housing having a housing hole and a fixing hole, the housing hole being formed longitudinally in the housing, the fixing hole connected perpendicularly to the housing hole;
a center conductor inserted in the housing hole and including a first conductor having a reception tube and a second conductor having a conductor shaft with an outer surface shape corresponding to a inner surface shape of the reception tube, the conductor shaft being inserted in the reception tube to function as electrode plates of a capacitor, the first conductor and the second conductor having a first connector pin and a second connector pin, respectively, the first connector pin and the second connector pin being respectively inserted inside of the output connector and the input connector to enable electric connection of a signal between the input connector and the output connector; and
a fixing pin havin a first end connected perpendicularly to the first conductor of the center conductor and a second end inserted in the fixing hole to fix the first conductor to the housing and to supply direct current power from the second end to the output connector, the direct current power being supplied to said first conductor through a filter and said fixing pin.

2. The bias-T apparatus as claimed in claim 1, wherein the housing further has a recess for receiving elements of the bias-T apparatus, the recess being formed at an upper portion of the housing, which is located above and connected to the fixing hole.

3. The bias-T apparatus of claim 1, wherein at least one of an inner surface of the reception tube and an outer surface of the conductor shaft is anodized.

4. A bias-T apparatus comprising:
a housing including an input connector and an output connector, the housing having a first hole and a second hole, the first hole being formed longitudinally in the housing, the second hole being formed perpendicularly to the housing hole;
a center conductor mounted in the first hole to enable electric connection of a signal between the input connector and the output connector, the center conductor comprising a first conductor having a reception tube and a second conductor including a conductor shaft with an outer surface shape corresponding to a inner surface shape of the reception tube, the conductor shaft being inserted in the reception tube to function as electrode plates of a capacitor, the first conductor and the second conductor having a first connector pin and a second connector pin, respectively, the first connector pin and the second connector pin being respectively inserted inside of the output connector and the input connector; and a fixing pin connected perpendicularly to the first conductor of the center conductor through said second hole to fix the first conductor to the housing and to supply direct current power to the output connector, the direct current power being supplied to said first conductor through a filter and said fixing pin.

5. The bias-T apparatus as claimed in claim 4, wherein the housing further has a recess for receiving elements of the bias-T apparatus, the recess being formed at an upper portion of the second hole of the housing.

6. The bias-T apparatus of claim 4, wherein said center conductor has a third hole, and said fixing pin screws said third hole through said second hole, the direct current supplied to said first conductor and radio frequency signal are transmitted to an antenna tower, the radio frequency signal is not outputted to said fixing pin to which the direct current power is applied, accommodated through an impedance of said fixing pin being indefinite through a coil constructing said filter.

7. The bias-T apparatus of claim 4, wherein at least one of an inner surface of the reception tube and an outer surface of the shaft is anodized.

8. The bias-T apparatus of claim 4, wherein said center conductor has a first connector pin to be connected to a ground base transceiver station through said input connector and a second connector pin to be connected to an antenna through said output connector.

9. The bias-T apparatus of claim 8, wherein said first connector pin is removably mounted on said first conductor.

10. The bias-T apparatus as claimed in claim 8, wherein the housing further has a recess for receiving elements of the bias-T apparatus, the recess being formed at an upper portion of the second hole of the housing.

11. The bias-T apparatus of claim 10, wherein said recess is formed to accommodate said filter being an electromagnetic interference (EMI) filter including coils and dielectric materials.

12. The bias-T apparatus of claim 10, wherein said recess is formed to accommodate a gas tube arrester and diodes for protecting the ground base transceiver station from surge voltage introduced from the output connector.

13. The bias-T apparatus of claim 10, wherein said center conductor has a third hole, and said fixing pin screws said third hole through said second hole.

* * * * *